United States Patent [19]

Poore

[11] 4,227,485
[45] Oct. 14, 1980

[54] FARROWING HOUSE

[76] Inventor: Donald L. Poore, Box 140 R.R. No. 3, Shelbina, Mo. 63468

[21] Appl. No.: 955,610

[22] Filed: Oct. 30, 1978

[51] Int. Cl.³ .............................................. A01K 1/00
[52] U.S. Cl. ........................................ 119/16; 119/20
[58] Field of Search ............................. 119/16, 19, 20

[56] References Cited

U.S. PATENT DOCUMENTS

| 1,439,157 | 12/1922 | Ford | 119/16 |
| 1,457,636 | 6/1923 | Shrauger | 119/16 |
| 2,712,677 | 7/1955 | Hyde | 119/16 X |
| 2,940,423 | 6/1960 | Frye | 119/16 X |
| 3,129,693 | 4/1964 | De Vore | 119/16 |
| 3,556,054 | 1/1971 | Honegger et al. | 119/16 |

FOREIGN PATENT DOCUMENTS 114108 3/1918 United Kingdom .................. 119/19

*Primary Examiner*—Louis G. Mancene
*Assistant Examiner*—Robert P. Swiatek
*Attorney, Agent, or Firm*—Gravely, Lieder & Woodruff

[57] ABSTRACT

A farrowing house constructed to provide an insulated, weather-tight structure and arranged interiorly with laterally spaced protections for the pigs without stressing the sow in an enclosure, and in which the pig protection is arranged in raised position so that, while the sow may turn around within the house she will be forced into a lying down position facing toward or away from the entrance. The farrowing house is provided with reversible pig retainer gate "or fence" which will permit the sow to enter and leave the house while keeping the pigs in the house, and all of the internal structure is carried by the house so the house may be bodily tilted up from a base or floor for cleaning.

4 Claims, 5 Drawing Figures

FARROWING HOUSE

BACKGROUND OF THE INVENTION

The problem which has existed for a considerable period of time in providing farrowing houses has been that the house has lacked weather-tightness and insulation to guard the sow during the farrowing period against extreme changes in weather. There has also been the problem of providing protection for the pigs after birth without creating for the sow the impression of being caged and prevented from turning around within the house, which caged impression creates stress within the sow. Some improvement in farrowing houses has been exhibited by the disclosure in Scamman U.S. Pat. No. 3,216,396 which issued Nov. 9, 1965. The farrowing house in this disclosure has not considered the stress effect when the sow is confined or restricted, and it lacks provision for adequately insulating the housing structure and providing for adequate access for cleaning.

A further example of farrowing house structure is found in Sievers et al U.S. Pat. No. 3,941,093 which issued Mar. 2, 1976 and refers to a portable farrowing house. Installation and removal of the farrowing bed requires an excessively large opening since the farrowing bed is not collapsible as it would thereby lose its ability to protect the pigs when the sow is inside the house.

BRIEF DESCRIPTION OF THE INVENTION

The present invention is directed to an improved farrowing house having novel features hereinafter to be discussed.

The objects of the present invention are to provide a farrowing house construct to furnish a warmer, tighter, and more conveniently arranged facility for protecting the pigs confined within the house while avoiding the stress effect on the sow by removing the impression of being caged.

A further object of this invention is to construct a farrowing house that makes use of the body heat of the sow and the pigs to assist in obtaining a better internal temperature in the house, thereby requiring less externally supplied heat, except in periods of low temperature.

It is further an object of the present invention to provide a farrowing house having a frame structure to more conveniently receive insulation so as to render it substantially weather proof, draft free and easier to clean.

An additional object of the present invention is to arrange a farrowing house with ventilation provisions when used during warmer weather, to use the ventilation provisions to facilitate access for cleaning, and to provide a detachable or independent floor structure so that the house may be tilted or raised from the floor structure for easy removal of the bedding material.

A preferred embodiment of the present invention consists of a farrowing house having insulated end, top and side walls protected from the weather by an external metallic or other suitable weather resistant sheathing material, a central aisle running lengthwise of the house and defined on each side by raised protective means for the pigs, support means for the pig protection means operatively arranged to be placed in a position to permit the sow to turn around in the central aisle, and equipped with a pig guard selectively positionable to be effective during the early growing period of the pigs without restricting the entrance and exiting of the sow.

BRIEF DESCRIPTION OF THE DRAWINGS

A preferred embodiment of the farrowing house is disclosed in the accompanying drawings, wherein.

DETAILED DESCRIPTION OF THE FARROWING HOUSE

Figure 1:
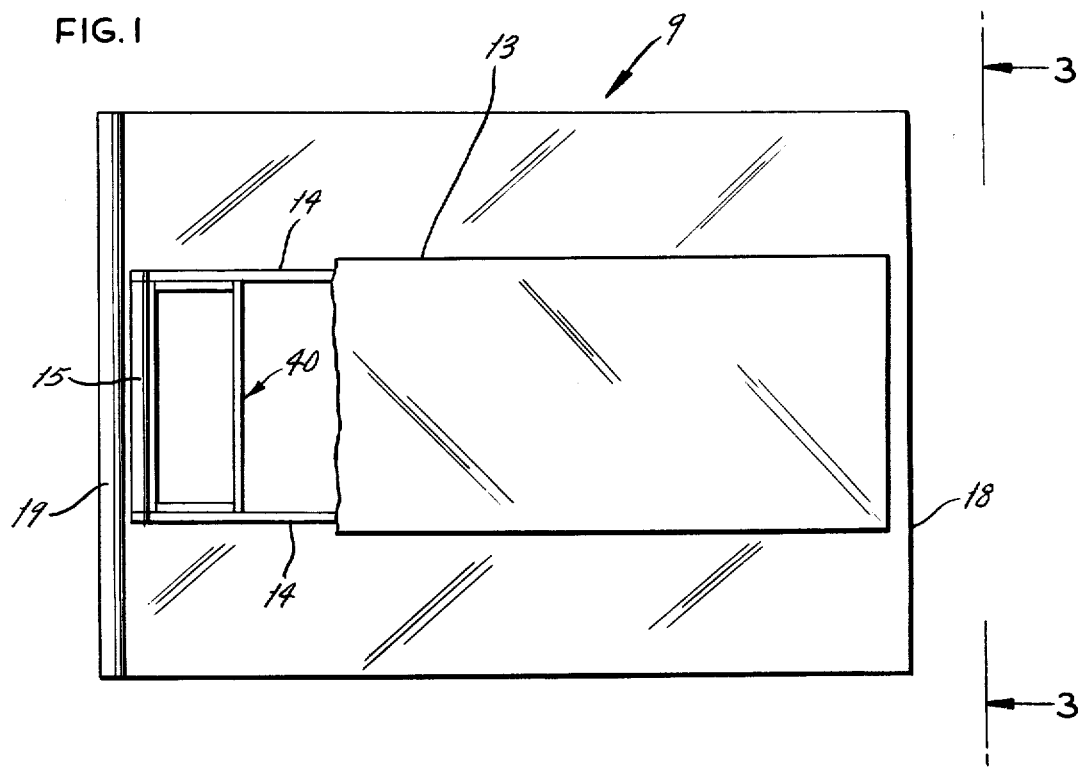
FIG. 1 is a top plan view of the farrowing house with a portion of the removable cover broken away to reveal internal details.
Figure 2:
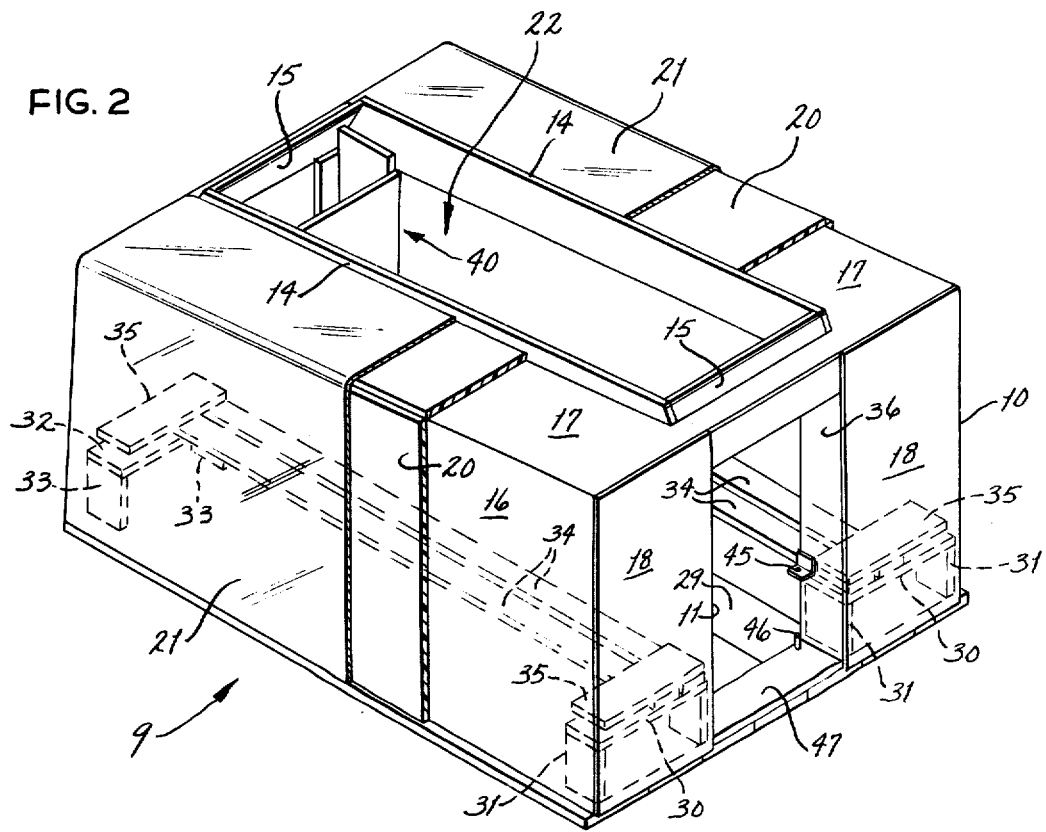
FIG. 2 is a perspective view of the farrowing house with the cover removed, and with portions of the exterior sheath and the underlying insulation sheets broken away to reveal the underlying plywood frame, and further with certain important internal structural details shown in phantom outline.
Figure 3:
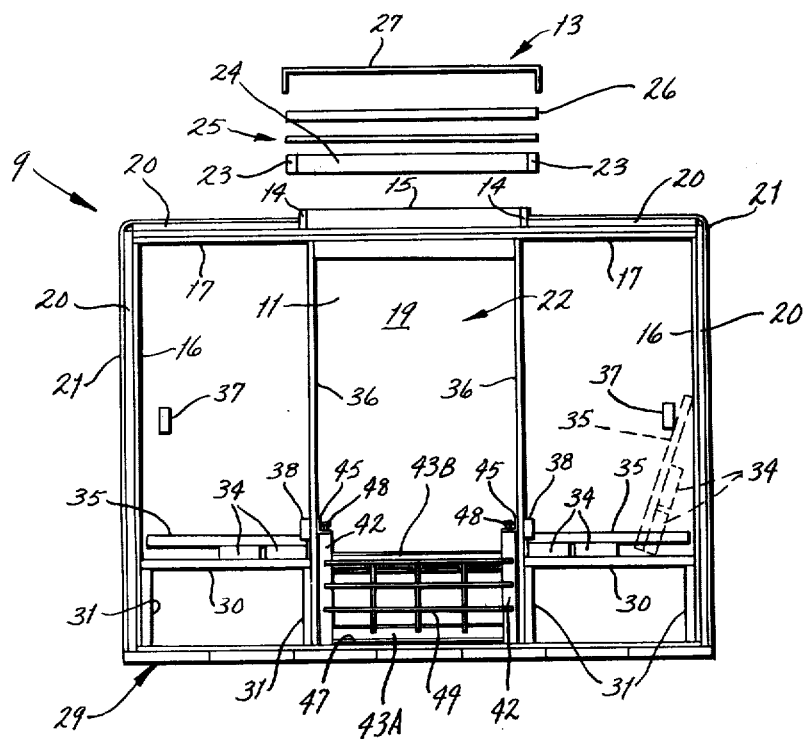
FIG. 3 is a front elevational view seen along the line 3—3 in FIG. 1, with the front walls removed to show internal structural details, and with the removable top cover shown in exploded assembly.

In the views of FIGS. 1, 2, and 3 it can be seen that the farrowing house 9 is constructed to be slightly higher at the front end 10 for rain run off purposes, and the front end 10 is provided with door opening 11 which may be closed by a suitable insulated door 12 (see FIG. 4) hinged along the vertical dimension. The house 9 is provided with a removable cover 13 which is adapted to fit over upwardly projecting flanges 14 extending from front to rear and interconnected by transverse flanges 15. The flanges 14 and 15 cooperate with the cover 13 to provide an adequate rain-proof seal, and to retain the cover in closed position against wind pressure. The cover may be completely removed for access to the interior of the house 9, or it may be raised at either end and held by a suitable prop (not shown) so as to permit ventilation when desired.

The principal frame structure for the house 9 consists of plywood panels 16 which extend along each lengthwise dimension of the house, top longitudinal panels 17, spaced front panels 18, and a suitable rear panel 19. As seen in FIGS. 2 and 3 the exterior surfaces of the plywood panels are covered with insulation sheets 20 so as to completely enclose the sides top and front and rear end walls with insulation material. The insulation material is then enclosed in metallic sheath material 21 so as to render the completed house weather-tight and able to exclude rain, snow and sleet. In this manner the house 9 is completely enclosed except for the door opening 11 and the longitudinal top opening 22 formed by the upstanding flanges 14 and 15.

It can be seen in FIG. 3 that the cover 13 is constructed with an underlying frame having longitudinal members 23 joined by transverse members 24 to form a frame to which a plywood panel 25 is secured. The panel 25 carries a sheet of insulation material 26, and the frame and insulation material is completely enclosed in a metallic sheath 27 so as to render it weather proof.

FIGS. 2 and 3 disclose important internal structure which consists in providing inside the front plywood panels 18 a suitable cross member 30 which is supported above the plane of the floor 29 a suitable distance by means of vertically directed spacers 31. The rear wall 19 is similarly provided on its interior surface with a cross member 32 held above the floor 29 by vertically directed spacers 33. The cross member 32 in FIG. 2 is shown at the left side of the rear wall 19, and it must be understood that a similar cross member and supporting spacers 33 are provided at the opposite or right side.

The foregoing cross members 30 and 32 at the front and rear interior walls of the house are provided to support the ends of pig protection means made up of adjacent longitudinal planks 34 which are tied together in slightly spaced relation by retainer arms 35. Each retainer arm 35 extends from the inside of the side wall 16 to approximately the inner margin of a longitudinal aisle which has a width substantially equal to the spacing of vertical door forming studs 36 (FIG. 3). These arms 35 are also secured adjacent the front and rear ends of the planks 34 and are on top of the planks for the purposes of holding the planks in operative position against being shoved or displaced laterally on the cross members 30 and 32 when the sow is in the center aisle. Furthermore, the inside surface of the end walls 18 and 19 are provided with retainer blocks 37 which are positioned so as to permit the retainer arms 35 to be lifted upwardly from the outer ends remote from the center aisle while sliding or shifting the planks 34 outwardly toward the side walls 16. The sliding movement of the planks 34 and the lifting of the retainer arms 35, as shown at the right hand side in FIG. 3, will result in the planks 34 being moved out of the way of the center aisle and held in such position by the retainer arms 35 being captured behind the retainer blocks 37. It is indicated in FIG. 3 that when the planks 34 are in the horizontal positions adjacent the center aisle they are prevented from being lifted upward by means of cleats 38. The cleats 38 prevent the sow from raising the planks 34 and thereby secure the planks in position to protect the pigs.

It can be seen in FIG. 1 that the rear end of the center aisle is provided with a box structure 40 for the purpose of housing suitable electrical heating means (not shown) which may consist of the desired size electric bulb. During periods of cool or cold weather when the outside temperature gets below freezing it is desirable to supplement the body heat of the sow and the pigs with electrical heat. If a light bulb is not desirable because of the illumination effect, other heating means of suitable capacity may be used.

Figure 4:
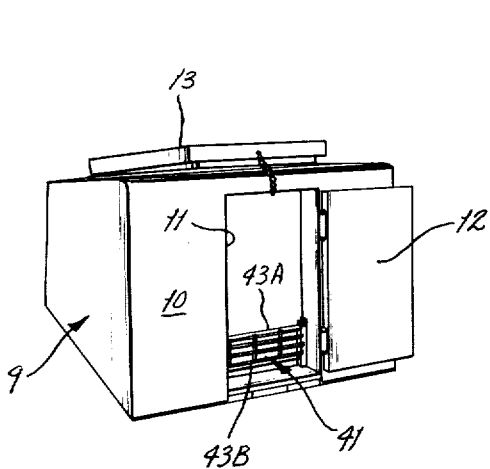
FIG. 4 is a front perspective view of the house with the door open and with the cover tilted upwardly for ventilation.

The opposite or front end of the center aisle at the door opening 11 is provided with a pig guard 41 which is made up of a suitable tubular frame having vertical tubular posts 42, spaced horizontal tubes 43A and 43B, and a suitable wire mesh or screen 44 secured to the posts and tubes. It is noted that the lower one of the horizontal tubes 43B in FIG. 4 is spaced above the lower ends of the respective posts 42, while the upper horizontal tube 43A is approximately even with the upper ends of the posts 42. The purpose of positioning the horizontal tubes 43A and 43B at different places on the posts 42 is to permit the pig guard 41 to be located in one of two positions. As shown in FIG. 3 the pig guard may be said to be in the low position, and when it is reversed with the bottom horizontal tube 43A uppermost it can be appreciated that the pig guard is in its high position. Means to hold the pig guard in operative position consists of brackets 45 secured on the respective door studs 36 and upwardly projecting pins 46 in the sill plate 47. Each of the posts 42 fits over the sill pins 46 to hold the bottom ends. The uppermost ends are held by retainer pins 48 which can be dropped through an aperture in the bracket 45 and into the posts 42 so as to secure tubes 42 under bracket 45 against being lifted up off the pins 46. It is possible by removing only one of the pins 48 to pivot the pig guard 41 out of the way, and when both pins 48 are removed the pig guard position may be reversed between its high and low positions.

Figure 5:
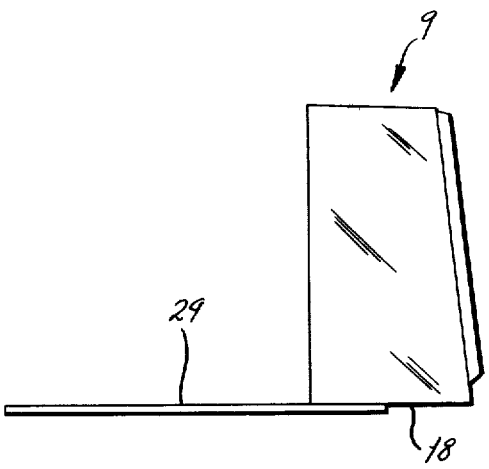
FIG. 5 is a side elevation of a house showing the bodily tilted off of the base or floor for purposes of cleaning.

A feature of the present farrowing house, in addition to those described above, is its ability to be bodily pivoted upwardly (see FIG. 5) onto its front walls 18 when the door 12 is closed so as to expose the base or floor 29 for thorough cleaning and for changing the bedding material.

While the foregoing description has dealt in particular with the unique features of a single farrowing house, it is to be understood that the unique features may be embodied in an installation comprising a number of farrowing houses built as a unit with a common wall between two adjacent houses. Even in a construction involving a multiple of farrowing houses, the above-described features will be repeated for each one of the houses.

The foregoing description is set forth in connection with a presently preferred embodiment of the invention. It is not desired, however, to limit the construction to exactly that which has been disclosed, as modifications may come to mind when the principals of the present invention are understood.

I claim:

1. A weather-tight and insulated sow farrowing house comprising: a frame structure having sides, a top and front and rear walls; a floor for supporting said frame structure; insulation enclosing said frame structure, and weather resistant sheathing covering said insulation; said top having an opening therein through said insulation and sheathing defined by outwardly projecting flanges; a cover structure removably fitted over said projecting flanges for retaining said cover in position closing said opening, said flanges being adapted to support said cover structure in partly raised position for ventilation of the interior of the house; said front wall having an opening for a door located substantially midway between said sides; a pig retaining guard fence operably mounted in said front wall opening adjacent said floor for presenting a barrier to egress of pigs without being a barrier for the sow; a door operably mounted at said front wall opening in position when in closed position over said opening to cover said guard fence; and pig protecting means in said frame structure in position to extend along the inside of each side wall between said front and rear walls, said protecting means being spaced apart a distance substantially the width of said front wall opening and each including load supporting means spaced above the floor to form a surface on which the sow may be supported and beneath which the pigs may be protected, and means to retain said load supporting means selectively in pig protecting position and in position shifted laterally toward said side walls.

2. The farrowing house set forth in claim 1, wherein said cover is bodily removable and is selectively supportable in partly raised position adjacent said front or rear walls, and the shifting of said pig protectors laterally toward said side walls opens up the interior of said housing for cleaning.

3. The farrowing house set forth in claim 1, wherein said top opening extends between said front and rear walls and is substantially registered over the space between said protecting means.

4. The farrowing house set forth in claim 1 wherein said pig guard is selectively positionable in either of two positions in said door opening.

* * * * *